Nov. 26, 1929.  F. LIEBL  1,736,977
METHOD OF AND MEANS FOR ROUNDING OFF OR BEVELING
EDGES OF GLASS OR LIKE ARTICLES
Filed Nov. 6, 1926
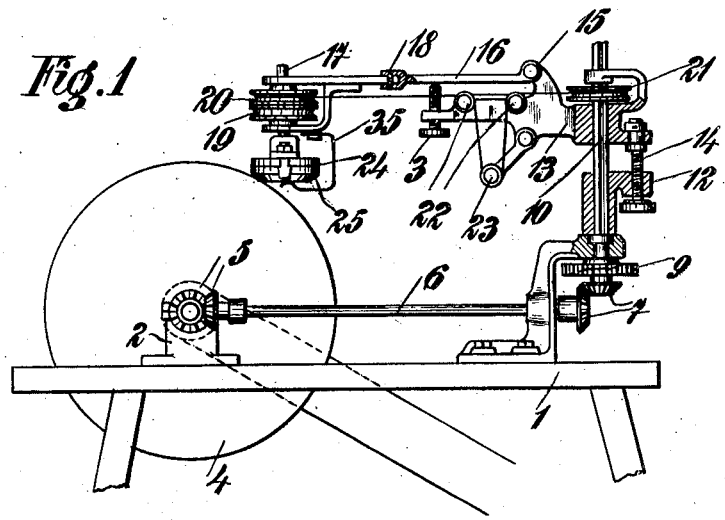
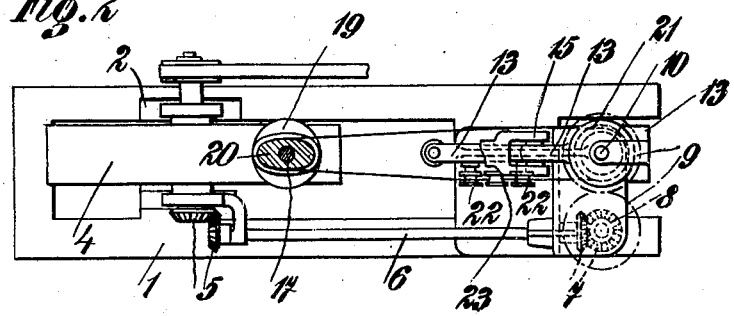
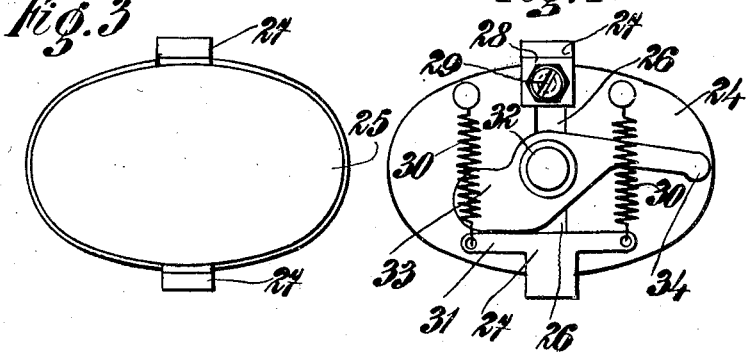
Inventor
Franz Liebl
By D. Singer, Atty.

Patented Nov. 26, 1929

1,736,977

UNITED STATES PATENT OFFICE

FRANZ LIEBL, OF VIENNA, AUSTRIA

METHOD OF AND MEANS FOR ROUNDING OFF OR BEVELING EDGES OF GLASS OR LIKE ARTICLES

Application filed November 6, 1926, Serial No. 146,696, and in Austria October 2, 1925.

This invention relates to an improved method of and means for rounding off or beveling edges of glass or like articles, the object being to provide an improved machine by means of which it is possible to so treat non-circular, elliptic or oval edges of a workpiece so that a chamfered or beveled edge of substantially uniform width and uniform inclination is formed.

According to the present invention the speed, by which the workpiece is supplied to the tool rotating with a uniform speed, is varied according to the curvature under treatment so that during the rotation the material is removed quite uniformly, while the entire grinding pressure remains unaltered.

An improved machine for carrying out the present invention is illustrated by way of example in the accompanying drawings in which—

Figs. 1 and 2 show a machine constructed according to the present invention in part-sectional elevation and part-sectional plan view respectively.

Figs. 3 and 4 illustrate a detail in plan view and inverted plan view respectively.

A grindstone 4, operated by a motor, is rotatably mounted in bearings 2, which are located on a frame 1. The rotary motion of the grindstone 4 is transmitted to an intermediate vertical shaft 8 which is mounted in a support 6ª by means of gears 5, a horizontal shaft 6 and gear 7. The said shaft 8 operates grooved vertical shaft 10 by means of gears 9 with which said shafts are provided. A sleeve 12 and a cantilever 13 are loosely mounted on the shaft 10. The vertical adjustment of the cantilever and the simultaneous rotation of the latter and of the sleeve about the shaft 10 is rendered possible by a screw-threaded shaft 14, which is mounted freely rotatable in the cantilever 13 and is threadedly engaged with a sleeve 12. A cantilever-arm 16 is pivotally secured to the cantilever 13 by means of a bolt 15, the free end of the said arm 16 being provided with bearings for a vertically disposed shaft 17. Said lever 16 has a hinge joint 18, so that the front portion of the arm 16 can be moved horizontally in order to adjust the shaft 17. The shaft 17 carries a disc 20 which is furnished with a curved circumference of similar shape to that of the edge of the work and is, for instance the elliptical disc 20 as at 19. The driving belt which engages the said disc or pulley 20 also passes around a belt pulley 21 which participates in the vertical adjustment of the cantilever 13 by the screw 14 and which belt pulley engages the groove of the shaft 10 by means of a key. Said driving shaft also passes over guide pulleys 22 and a tensioning roller 23. Chucks for any desired workpiece, for instance plane-mirrors, may be secured to the shaft 17 in any known manner. In the construction for mirrors of elliptical shape as shown in Figs. 3 and 4, the mounting plate 24 is shaped according to the curvature of the workpiece 25 and furnished with a guide-slot 26, which passes in the direction of the short axis and in which are mounted two jaws 27, one of the latter being adjustably fixed by means of a plate 28 and a clamping nut 29, while the other jaw slides in the guide-slot 26 and is pressed against the edge of the work 25 by means of springs 30. One end of the latter is secured to the arms 31 of the jaw 27 and the other end thereof is attached to the mounting plate 24. In order to open the chuck and enable the workman to quickly exchange the work, an eccentric 33 is pivotally mounted on a bolt 32 and by operating the handle 34, the eccentric 33 can be caused to move the movable jaw 27 against the action of the springs 30. A spring 35 (Fig. 1) prevents a premature dropping off of the work 25.

The machine operates in the following manner:

For grinding non-circular for instance elliptic edges, the work-chuck is secured to the machine and so arranged, that the axes of the work and of the elliptic belt-pulley 20 are disposed in vertical alignment.

The free end of the arm 16, carrying the shaft 17, can be turned upon the hinge 18 in order to render the work more readily accessible and to facilitate the removal of the same. Slight differences in the length of the minor axes of the work to be ground may be compensated for by slightly adjusting the fixed jaw 27. Owing to the weight of the freely oscillating cantilever arm 16 an elastic grinding pressure of sufficient strength is produced, which remains constant during the entire period of grinding in spite of the oscillation of the cantilever arm caused by the difference in the axes of the ellipse. The drop of the cantilever arm 16 is limited by an adjusting screw 3, mounted on the cantilever 13 and opposing the arm 16. The non-circular or elliptic belt-pulley 20 causes a constantly varying speed of rotation and therefore of feed. Any slackness in the belt is taken up by the tensioning roller 23.

As the axes of the work and the pulley are in alignment the feed speed will be highest at the points of greatest curvature and lowest when grinding the edge in the direction of the minor elliptic axis. The removal of the material is automatically adjusted by this arrangement and the width of the bevelled edge is substantially uniform. The edge angle can be varied by vertically adjusting the cantilever 13, in order to vary the angle between the work and the tangent at the grindstone 4. It will be understood that by a suitable selection of the shape of the non-circular pulley any desired shape of convex curve may be obtained.

I claim—

A machine of the class described, comprising a grindstone mounted for rotation, a shaft geared thereto, a vertical shaft geared to the first named shaft, bearings for said shafts, a driving pulley on the vertical shaft and splined thereto for rotation therewith and vertical movement thereon, a cantilever on said vertical shaft and movable thereon, together with the driving pulley, means to vertically adjust the cantilever, an arm pivotally connected to the cantilever for vertical angular movement, and means to vertically adjust said arm, said arm having a member forming an extension of its free end and pivotally connected thereto, a shaft having its bearings in said extension of said arm and provided with a non-circular pulley and also with a non-circular work holder and an endless belt connecting said non-circular pulley with said driving pulley on said vertical shaft.

In testimony whereof I affix my signature.

FRANZ LIEBL.